United States Patent [19]

Chang et al.

[11] Patent Number: 5,765,199
[45] Date of Patent: Jun. 9, 1998

[54] DATA PROCESSOR WITH ALOCATE BIT AND METHOD OF OPERATION

[75] Inventors: Joseph Y. Chang; Hidayat Lioe, both of Cedar Park; Paul A. Reed; Brian J. Snider, both of Austin, all of Tex.

[73] Assignee: Motorola, Inc., Schaumburg, Ill.

[21] Appl. No.: 717,142

[22] Filed: Sep. 20, 1996

Related U.S. Application Data

[63] Continuation of Ser. No. 188,987, Jan. 31, 1994, abandoned.

[51] Int. Cl.$^6$ .................................................. G06F 12/00
[52] U.S. Cl. ........................... 711/168; 711/170; 711/3; 711/144; 711/145; 711/154; 711/160
[58] Field of Search .................... 395/403, 455, 395/471–473; 711/3, 128, 144, 145, 146, 150, 154, 168, 170, 160

[56] References Cited

U.S. PATENT DOCUMENTS

| | | | |
|---|---|---|---|
| 4,910,656 | 3/1990 | Scales, III et al. | 711/144 |
| 4,977,498 | 12/1990 | Rastegar et al. | 711/128 |
| 5,185,878 | 2/1993 | Baror et al. | 711/123 |
| 5,276,835 | 1/1994 | Mohan et al. | 711/144 |
| 5,297,269 | 3/1994 | Donaldson et al. | 711/145 |
| 5,317,718 | 5/1994 | Jouppi | 711/137 |
| 5,325,504 | 6/1994 | Tipley et al. | 711/128 |
| 5,353,425 | 10/1994 | Malamy et al. | 711/144 |
| 5,355,467 | 10/1994 | Mac Williams et al. | 711/146 |
| 5,428,761 | 6/1995 | Herlihy et al. | 711/130 |
| 5,434,993 | 7/1995 | Loencres et al. | 711/133 |
| 5,479,634 | 12/1995 | Takita | 711/141 |
| 5,479,641 | 12/1995 | Nadir et al. | 711/128 |
| 5,550,995 | 8/1996 | Barrers et al. | 711/3 |

*Primary Examiner*—Eddie P. Chan
*Assistant Examiner*—Hong C. Kim

[57] ABSTRACT

A data processor (10) has a cache array (40) and a control unit (58) for storing a number of recently accessed data lines. If an execution unit requests a data line that is not stored in the memory cache (a miss) then the control unit will request the data from an external memory device and allocate a location in the cache array in which it will store the requested data when returned. In the depicted embodiment, the control unit first attempts to allocate an invalid one of N possible locations, where N is the set way associativity of the memory cache. If none of the ways is invalid, then the control unit uses a least recently used (LRU) algorithm to select the location. Therefore, the data cache may be non-blocking up to N times to the same set.

18 Claims, 4 Drawing Sheets

INTERNAL WRITE MISS,
INTERNAL READ MISS

| M | S | V | STATE: |
|---|---|---|---|
| X | 0 | 0 | INVALID (I) |
| 0 | X | 0 | INVALID (I) |
| 0 | 0 | 1 | EXCLUSIVE UNMODIFIED (E) |
| 0 | 1 | 1 | SHARED (S) |
| 1 | 0 | 1 | EXCLUSIVE MODIFIED (M) |
| 1 | 1 | 0 | ALLOCATED (A) |

CLEAN

FLUSH

KILL

EXTERNAL READ

EXTERNAL WRITE

INTERNAL WRITE MISS,
INTERNAL READ MISS

INTERNAL WRITE HIT, INTERNAL READ HIT

DATA PROCESSOR WITH ALOCATE BIT AND METHOD OF OPERATION

This application is a continuation of prior application Ser. No. 08/188,987 filed Jan. 31, 1994, now abandoned.

FIELD OF THE INVENTION

The present invention generally relates to digital computing systems, and more specifically to a data processor with a memory cache.

BACKGROUND OF THE INVENTION

Data processing systems typically incorporate memory caches to improve system performance. A memory cache stores a subset of the contents of the data processing system's main memory that it frequently accesses. The contents of the memory cache may be data, may be instructions, or may be a combination of the data and instructions. A memory cache increases the performance of the data processor because the data processor can access the contents of the memory cache faster than it can access the contents of the main memory. The data processor can access the contents of the memory cache faster because the memory cache is (1) fabricated from faster components than is the main memory, (2) is accessed by the data processor through a dedicated bus, (3) is integrated on to the same semiconductor device as is the data processor, or (4) any combination of (1), (2) and (3).

Memory caches may be described as "N-way set associative," where N is an integer, typically two, four or eight. In such a memory cache, a data line may be stored in any one of N ways in a memory cache. The N ways form a "set" that is binarily indexed by a portion of an input address. The input address identifies the location of the requested data in main memory. Each way has associated with it a tag. The tag stores the portion of the input address not used as the binary index. Every valid tag in a set is compared to the corresponding portion of the input address to determine if the memory cache contains the requested data. If one of the tags matches the corresponding portion of the input address then a "hit" occurs and the data stored in the cache line associated with the matching tag is output as the requested data. If none of the tags matches the corresponding portion of the input address then a "miss" occurs and the memory cache must itself request the requested data from the memory system.

Memory caches may also be described as blocking or non-blocking. This feature describes what the memory cache can or can not do during the time period beginning after a miss occurs and lasting until the memory system returns the requested data. A blocking memory cache refuses all subsequent data requests once it misses a first request. A non-blocking cache continues to service at least some subsequent data requests after it misses the first request. All other parameters being equal, a non-blocking cache can provide more data to a data processor than can a blocking memory cache.

Even the most limited non-blocking memory caches are significantly more complex than blocking caches. Non-blocking memory caches typically will become blocking with respect to a particular set from the time the memory cache misses in the particular set until the requested data is written to the particular set. This change will not affect hits to the particular set nor will it affect any accesses to other sets within the memory cache. However, the memory cache will force the circuit requesting any data that misses in the particular set to re-try the operation at a later time. Otherwise, the memory cache might write two returned data lines to the same way in the particular set. Even this limited non-blocking cache design requires an address comparison between the memory cache input and a queue of pending system memory accesses for each memory cache miss.

SUMMARY OF THE INVENTION

In accordance with the present invention, there is disclosed a data processor having a memory cache which substantially eliminates disadvantages of known data processors.

A data processor has an execution unit and a memory cache coupled together. The execution unit generates an address of a requested cache line. The memory cache has a cache array and a control unit. The cache array has a plurality of sets. Each one of the plurality of sets has a plurality of ways. Each one of the plurality of ways stores a cache line and a tag. The cache array outputs a cache line of a selected way if the tag of the selected way is logically equivalent to a subset of the address of the requested cache line. The set containing the selected way (the selected set) is selected by a subset of the address of the requested cache line. In the event of cache line miss, the control unit selects an allocated way. The allocated way is one of the ways of the selected set.

A method of operating a data processor is also described. The method has the steps of first receiving an input address of a requested data line in a data cache, first determining that the requested data line is not present in the data cache, and allocating a storage location in the data cache, an allocated cache line. The method further has the steps of requesting the data line from an external storage device, second receiving the requested data line from the external device in the data cache, and storing the requested data line in the allocated cache line.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION OF THE EMBODIMENT

Figure 1:
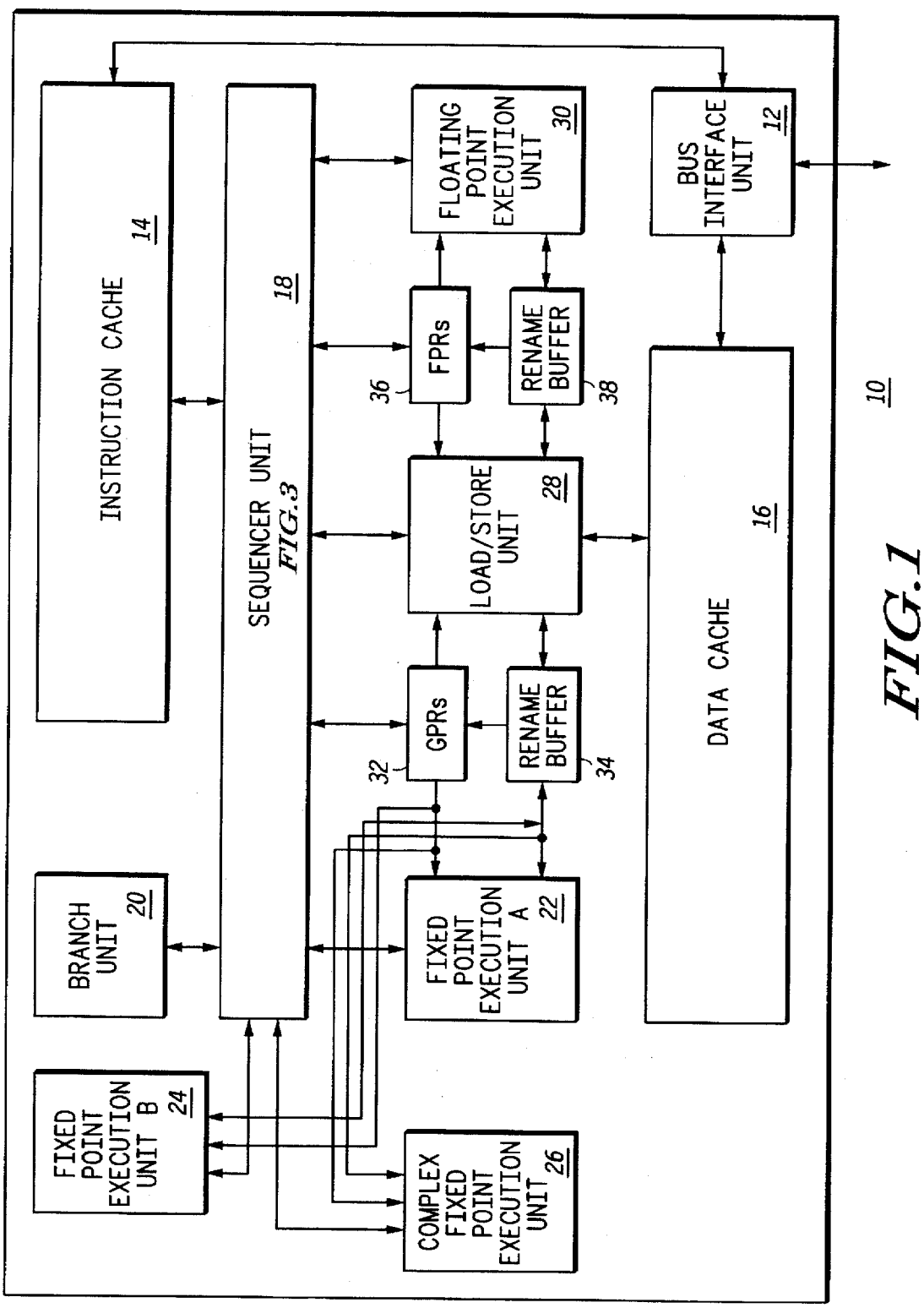
FIG. 1 depicts a block diagram of a data processor constructed in accordance with the present invention.

FIG. 1 depicts a block diagram of a data processor 10 constructed in accordance with the present invention. Data processor 10 is a data processor that improves its performance by storing frequently used data in an integrated memory cache. The memory cache is a four-way set associative non-blocking cache containing 512 cache lines. The disclosed memory cache may be advantageously incorporated into high performance data processing systems. However, the disclosed non-blocking cache is not significantly more difficult to implement than a lowering performing blocking cache of the same size. Each cache line stores 256 bits of data, a twenty bit tag identifying the location in main memory of the data when combined with the cache line's binary index, and three status bits. The memory cache also contains six least recently used ("LRU") bits for each set of four cache lines. The three status bits define a state for each cache line as part of a data coherency protocol. An additional state is called an allocate state and is assigned to one entry in a particular way after the way misses. The LRU bits and the status bits determine which way is "allocated" after each miss. The memory cache stores the requested data, when returned, in the allocated way. Therefore, the disclosed memory cache may continue to be non-blocking in the same way up to N times, where N is the wayness of the cache.

Continuing with FIG. 1, a bus interface unit (hereafter BIU) 12 controls the flow of data between data processor 10 and the remainder of a data processing system (not depicted). BIU 12 is connected to an instruction cache 14 and to a data cache 16. Data cache 16 is more fully described below in connection with FIGS. 2 through 11. Instruction cache 14 supplies an instruction stream to a sequencer unit 18. Sequencer unit 18 forwards individual instructions to an appropriate execution unit. Data processor 10 has a branch unit 20, a fixed point execution unit A 22, a fixed point execution unit B 24, a complex fixed point execution unit 26, a load/store execution unit 28, and a floating point execution unit 30. Fixed point execution unit A 22, fixed point execution unit B 24, complex fixed point execution unit 26, and load/store execution unit 28 read and write their results to a general purpose architectural register file 32, (labeled GPRs and hereafter GPR file) and to a first rename buffer 34. Floating point execution unit 26 and load/store execution unit 28 read and write their results to a floating point architectural register file 36, (labeled FPRs and hereafter FPR file) and to a second rename buffer 38.

The operation of data processor 10 without the disclosed data cache is known in the art. In general, branch unit 20 determines what sequence of programmed instructions is appropriate given the contents of certain data registers and the instructions themselves. Instruction cache 14 provides this sequence of programmed instructions to sequencer 18. If instruction cache 14 does not contain the required instructions, then it will fetch them from a main memory system external to data processor 10 (not shown).

Sequencer unit 18 issues the individual instructions of the sequence of programmed instructions to the various execution units 20, 22, 24, 26, 28 and 30. Each of the execution units performs one or more instructions of a particular class of instructions. The particular class of instructions of each execution unit is indicated by the name of the execution unit. For instance, fixed point execution units A and B perform simple mathematical operations on operands expressed in fixed point notation such as addition, subtraction, ANDing, ORing and XORing. Complex fixed point execution 26 performs more complex mathematical operations on operands expressed in fixed point notation such as multiplication and division. Floating point execution unit 30 performs mathematical operations on operands expressed in floating point notation such as multiplication and division.

Fixed point execution units A and B and complex fixed point unit 26 return the results of their operations to designated entries in first rename buffer 34. First rename buffer 34 periodically updates an entry of GPR file 32 with an entry from first rename buffer 34 when all instructions preceding the instruction that generated the result have updated their GPR file entries. Sequencer unit 18 coordinates this updating. Both first rename buffer 34 and GPR file 32 can supply operands to fixed point execution units A and B and to complex fixed point unit 26.

Floating point execution unit 30 returns the results of its operations to designated entries in second rename buffer 38. Second rename buffer 38 periodically updates an entry of FPR file 36 with an entry in second rename buffer 38 when all instructions preceding the instruction that generated the result have updated their FPR file entries. Sequencer unit 18 also coordinates this updating. Both second rename buffer 38 and FPR file 36 supply operands to floating point execution unit 30.

Load/store unit 28 reads data stored in GPR file 32, first rename buffer 34, FPR file 36 or second rename buffer 38 and writes the selected data to data cache 16. This data may also be written to an external memory system (not depicted) depending upon operating characteristics of data processor 10 not relevant to the disclosed invention. Conversely, load/store unit 28 reads data stored in data cache 16 and writes the read data to GPR file 32, first rename buffer 34, FPR file 36 or second rename buffer 38. If data cache 16 does not contain the required data, then it will fetch it from the main memory system external to data processor 10 via BIU 12.

The operation of data processor 10 with the disclosed data cache is described below in connection with FIGS. 2 through 6. In general, data processor 10 is a reduced instruction set computer ("RISC"). Data processor 10 achieves high performance by breaking each instruction into a sequence of smaller steps, each of which may be overlapped in time with steps of other instructions. This performance strategy is known as "pipe lining." In the depicted embodiment, each instruction is broken into five discrete steps: fetch, decode, dispatch, execute, and completion.

In the fetch stage, memory management circuitry (not shown) within instruction cache 14 retrieves one or more instructions beginning at a memory address identified by sequencer unit 18 or by branch unit 20 in the prior clock cycle.

In the decode stage, instructions are decoded by the sequencer unit 18 into a number of control signals for use by subsequent stages.

In the dispatch stage, sequencer unit 18 routes each instruction to the appropriate execution unit after determining that there are no impermissible data or resource dependencies and after reserving a rename buffer entry for the result of the instruction. The dispatch stage is also responsible for supplying operand information for the instructions being dispatched.

In the execute stage, each particular execution unit executes its programmed instruction. Results, if any, are returned either to rename buffer 34 or rename buffer 38, respectively, for integer and floating point results.

In the completion stage, sequencer unit 18 updates the architectural register files with the result of a particular instruction stored in a rename buffer after every instruction preceding the particular instruction has so updated the architectural resister file. The completion stage also updates all other architectural states in the machine after every instruction preceding the particular instruction has so updated the architectural state.

Generally, each instruction stage takes one machine clock cycle. However, some instructions, such as complex fixed point instructions, require more than one clock cycle to execute. Therefore, there may be a delay between the execution and completion stages of a particular instruction due to the range of times which previous instructions may have taken to execute.

Figure 2:
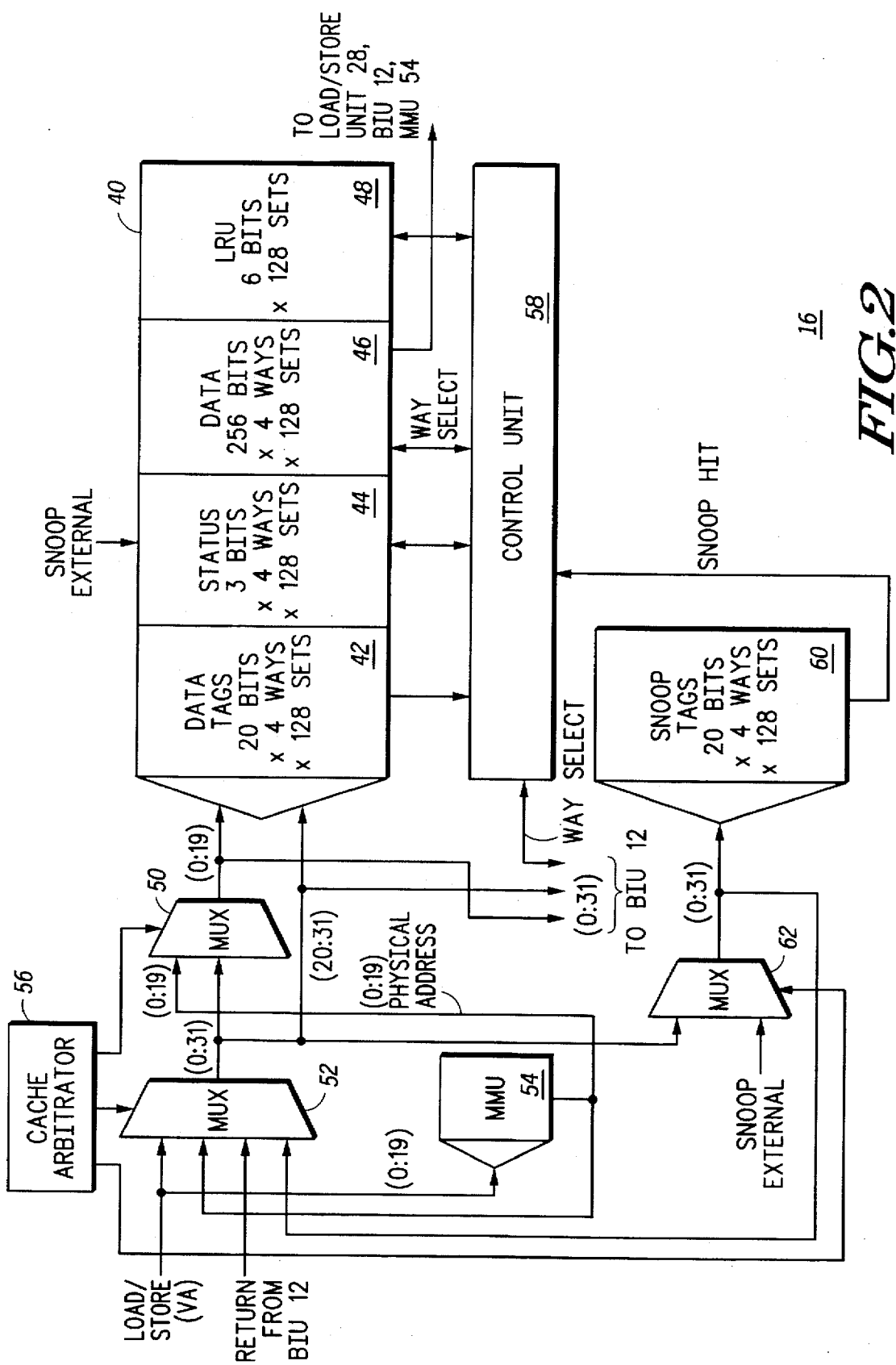
FIG. 2 depicts a block diagram of the data cache depicted in FIG. 1.

FIG. 2 depicts a block diagram of data cache 16 depicted in FIG. 1. Data cache 16 is a four-way set associative cache. All cache line information is stored in static random access memory ("SRAM") bit-cells. Data cache 16 contains a cache array 40 containing 512 cache lines organized as 128 sets of 4 ways per set. Each of the 512 cache lines contains a tag entry 42, a status entry 44, a data entry 46 and a least recently used ("LRU") entry 48. A tag address multiplexer ("MUX") 50 determines which source of address bits 0:19 is presented to tag array 42 during a read or write operation. The twenty bits may be sourced from an input address multiplexer ("MUX") 52 or a memory management unit ("MMU") 54. Input address multiplexer 52 itself receives the index address portion of the input address from BIU 12, MMU 54, Load/Store unit 28, or snoop tag multiplexer 62. A cache arbitrator 56 determines which unit has read or write access to cache array 40 based on the various operations of data processor 10 and a priority scheme not related to the disclosed invention. Data cache 16 also has control unit 58 coupled cache array 40 and to a snoop tag array 60. Snoop tag array 60 contains a copy of the address tags stored within tag array 42. A snoop tag multiplexer ("MUX") 62 determines the source of the input address to snoop tag 60. Snoop tag multiplexer 62 can forward to snoop tag array 60 either an address output by input address multiplexer 52 or the address supplied by an external devices responsive to a snoop operation, "SNOOP EXTERNAL.

Cache array 40 stores a cache line of 256 data bits in the data array 40 any of the four ways within a selected set. The twelve least significant bits of the address that indexes the cache line in main memory also indexes the selected set. Tag array 42 of the selected way within the chosen way stores the twenty-bits of the address not used to index the selected set. Tag array 42 also contains four twenty-bit tag comparators that compares the tag portion of the input address to the tags stored at the set specified by the index portion of the input address. Tag array 42 signals control unit 58 if it finds a match. Status array 44 stores three status bits for each cache line. These three bits identify which state of a data coherency protocol is associated with the cache line. These three bits also indicate if the cache line has been allocated for replacement. Status array 44 and LRU array 48 are implemented with dual-ported SRAM cells These extra ports allow the contents of each array to be read from and written to in the same clock cycle. LRU array 48 stores six bits for each set of four cache lines. These six bits indicate which of the four cache lines ("which way") in each set is the least recently used of each set.

MMU 54 performs the function of memory management for data cache 16. The data of the logical address of Load/Store 28 may actually be contained in a different physical address location with the data processing system's main memory (not shown). MMU 58 stores information relating the two mapping schemes and performs an address translation each time load/store unit 28 presents an address to data cache 16.

Control unit 58 monitors the read or write access operations performed by cache array 40, updates the status of LRU array 48, and allocates a way in the event of a "cache miss."

Snoop tag array 60 also contains four twenty-bit tag comparators that compare the tag portion of the input address to the tags stored at the set specified by the index portion of the input address. This feature allows data cache 16 to service a snoop operation and an internal load/store operation in the same clock cycle.

Data cache 16 performs two major functions and a variety of secondary functions. First, data cache 16 provides data to the various execution units or stores data from the various execution units to main memory. This data may be in data cache 16 when initially requested, a "hit" or may not be in data cache 16 when initially requested, "miss." (The disclosed data coherency protocol requires that data written or stored to main memory must first be in data cache 16. Therefore, a store operation must also hit in cache array 40.) Second, data cache 16 maintains a data coherency protocol by monitoring, or "snooping," each transaction that occurs in the data processing system incorporating data processor 10. The data coherency protocol of the depicted embodiment is described below in connection with FIGS. 4 through 11.

During a cache access, cache arbitrator 56 forwards the twelve least significant bits of the virtual address ("VA") generated by load/store unit 28 to cache array 40. Simultaneously, MMU 54 translates the twenty most significant bits of the same virtual address into a real tag and forwards the real tag to tag array 42. As described above, the twelve least significant bits of the virtual address index into one set of four cache lines, a way. Tag array 42 compares the presented real tag with the four tags associated with the selected set. If one of the tags in the selected way is logically equivalent to the real tag and is valid, then a "hit" occurs. In this case of a hit, tag array 42 asserts a control signal received by control unit 58. If none of the valid tags in the selected way is logically equivalent to the real tag, then a "miss" occurs. In this case of a miss, tag array 42 de-asserts the control signal received by control unit 58.

In the case of a cache hit, the data array entry associated with the matching tag is manipulated according to the type of instruction causing the hit. If the operation is a load operation, then data cache 16 forwards sixty-four bits of the 256 bits of data stored in the hit cache line to load/store unit 28. If the operation is a store operation, then data cache 16 replaces sixty-four bits of the 256 bits of data stored in the hit cache line with data provided by load/store unit 28. In both of these instances, two additional bits of the input address select the particular double-word. Also, control unit 58 will modify the data state stored in status array 44 of the hit cache line as described below in connection with FIGS. 3 through 11.

Figures 3, 4:
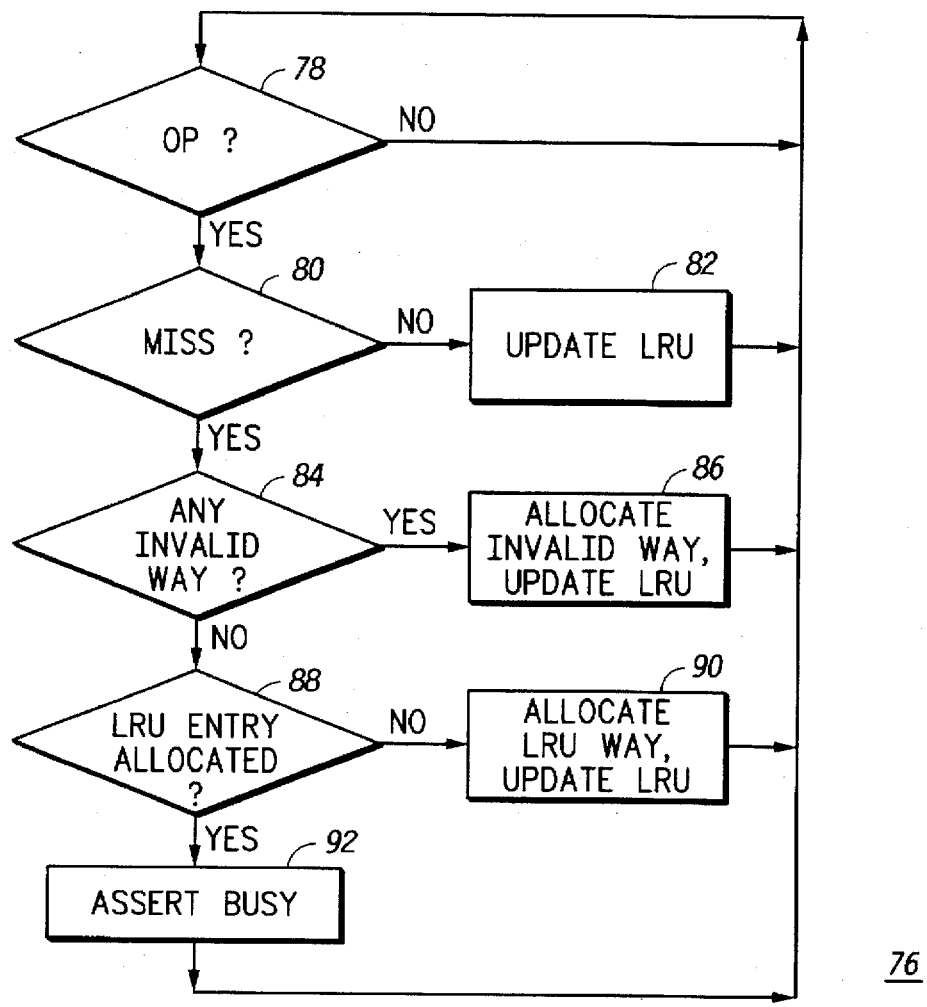
FIG. 3 depicts a flow diagram illustrating how the disclosed invention selects a particular way within the data cache depicted in FIG. 2 after a miss.
FIG. 4 depicts, in tabular form, the data coherency protocol executed by the data processor depicted in FIG. 1.
Figure 10:
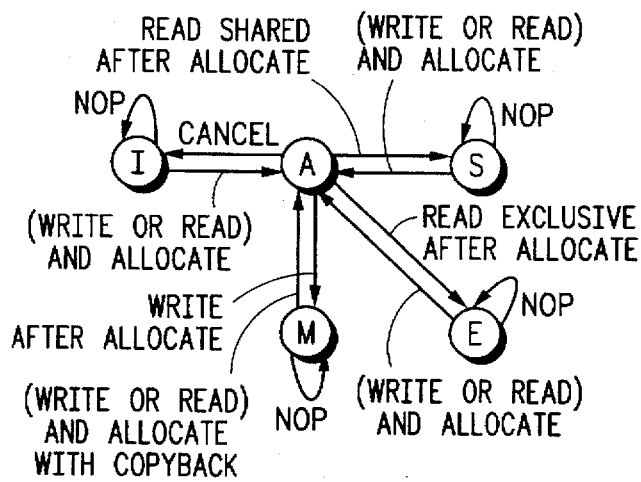

In the case of a cache miss, the addressed data must first be obtained from main memory. Control unit 58 detects a miss by the de-assertion of the control signal described above. Control unit 58 simultaneously reads the LRU entry of the selected set and the four status entries of the selected way. Control unit 58 allocates one of the four ways of the selected way as the location where the requested data will be stored once returned from main memory. Control unit 58 modifies the status entry of the allocated way to reflect its new state. FIG. 3 depicts how control unit 58 allocates one way of the four ways in any particular set. FIG. 10 depicts how control unit 58 modifies the status of the allocated way. Control unit 58 then forwards a request for the data to BIU 12 along with an indication of the allocated way, "WAY SELECT."

Eventually, BIU 12 returns the requested data to data cache 16 along with its address, its new data coherency protocol state, and WAY SELECT. Cache arbitrator 56 forwards the address of requested data to cache array 40 thereby selecting a set as described above. Control unit 58 then selects the particular way within the selected set responsive to the control signal WAY SELECT. BIU 12 writes the data and the twenty most significant bits of its address into the data entry and the tag entry, respectively, of the selected way. Control unit 58 modifies the status entry of the allocated way to reflect its new state. FIG. 10 depicts how control unit 58 modifies the status of the allocated way.

Snoop tag array 60 allows data cache 16 to service snoop operations from external sources without interfering with normal operations. These snoop operations are initially received by BIU 12. Snoop tag multiplexer 62 forwards the snoop address to snoop tag array 60. Snoop tag, array 60 and tag array 42 maintain identical sets of real tags. Snoop tag array 60 may or may not contain the real tag specified by the snoop. If the snoop tag array 60 does contain the snooped tag then a snoop hit occurs. If the snoop tag array 60 does not contain the snooped tag then a snoop miss occurs. Snoop tag array asserts a control signal SNOOP HIT received by control unit 58 in the case of a snoop hit. The details of a snoop hit or snoop miss are substantially similar to the operational details of a tag hit or tag miss described above. BIU 12 also forwards the snoop address to the second port of status array 44. Status array 44 simultaneously forwards the stored status of the snooped entry to control unit 58. If a snoop tag hit occurs, then control unit 58 modifies the status of the snooped entry according to the data coherency protocol. The data coherency protocol of the depicted embodiment is described below in connection with FIGS. 5 through 11. If a snoop tag miss occurs then, control unit 58 does nothing.

FIG. 3 depicts a flow diagram 76 illustrating how the disclosed invention selects a particular way within the data cache depicted in FIG. 2 after a miss. Control unit 58 executes a no operation loop while it waits for a data cache access to occur, a step 78. Once an access occurs, control unit 58 receives the control signal from tag array 42 indicating whether the access is a tag hit or a tag miss, a step 80. (As described above, control unit 58 performs other functions not related to the allocation of a way.) If the access results in a hit, then control unit 58 updates the LRU entry of the selected set to reflect that the hit way is now the new most recently used way, that the previous most recently used entry is now the new second most recently used way, etc., a step 82. If the access results in a miss, then control unit 58 determines if any way in the selected set is invalid, a step 84. If one of the ways is invalid, then control unit 58 allocates the invalid way, a step 86. Control unit 58 also updates the LRU entry of the selected set to reflect that the allocated way is now the most recently used way, that the previous most recently used entry is now the new second most recently used way, etc. in step 86. If none of the ways is invalid, then control unit 58 determines if the least recently used way is allocated, a step 88. If the least recently used way is not allocated, then control unit 58 allocates the least recently used way, a step 90. Control unit 58 also updates the LRU entry of the selected set to reflect that the allocated way is now the most recently used way, that the previous most recently used entry is now the new second most recently used way, etc. in step 90. If the least recently used way is already allocated, then control unit 56 asserts a control signal to the execution unit requesting the data indicating that it is busy. The requesting execution unit must then re-try the request at a later time, a step 92

It should be understood that the depicted embodiment only determines if the least recently used way is not allocated before asserting the busy control signal. This design choice was a compromise between predicted data cache use and design simplicity. Other embodiments of the disclosed invention may determine if the second most recently used way, third most recently used way, etc. is not allocated before asserting the busy control signal.

FIG. 4 depicts, in tabular form, the data coherency protocol executed by the data processor depicted in FIG. 1. This data coherency protocol attributes one of five data states to every cache line in data cache 16: (1) exclusive modified ("M"), (2) exclusive unmodified ("E"), (3) shared ("S"), (4) Invalid ("I"), and (5) allocated ("A"). States one through four define a protocol known as a "MESI" protocol (pronounced messy). The exclusive modified state indicates that a valid copy of the cache line data is contained in data cache 16 and data cache 16 has exclusive ownership of the data within the data processing system. The exclusive modified state also indicates that the cache line has been modified or changed relative to the data processing system's main memory. The exclusive unmodified state indicates that data cache 16 has a valid copy of the cache line data and has exclusive ownership of the data within the data processing system. The shared state indicates that data cache 16 has a valid copy of the cache line data but the data is shared with other data processors within the data processing system. The invalid state indicates that data cache 16 does not have a valid copy of the cache line. The allocated state indicates that data cache 16 does not have a valid copy of the cache line but has reserved the particular way to store the cache line once the main memory returns the data.

The four MESI states and the allocate state are stored in status array 44 and are encoded by three status bits for each cache line: a modified bit ("M"), a shared bit ("S"), and a valid bit ("V"). As depicted in FIG. 4, the invalid state is defined to be any cache line which does not have the valid bit set. The exclusive unmodified state is defined as the modified bit not set, the shared bit not set, and the valid bit set. The shared state is defined as having the modified bit not set, the shared bit set, and the valid bit set. The exclusive modified state is defined as having the valid bit set and the shared bit not set and the modified bit set. The allocated state is defined has having the invalid bit not set and both the shared and modified bits set.

The encoding scheme depicted in FIG. 4 has several features that make it compatible with high speed data processor design. The allocated state is easily distinguished from one of the other allowable MESI states because no cache line can be marked as both shared (S set high) arid modified (M set high) within the data processing system. Also, an allocated cache line is ignored during regular data cache accesses since the valid bit is cleared. Control unit 58 need only decode the valid bit to determine if it must modify the status of the cache line during an external snoop access. In the two invalid states, only one of either modified or shared bits needs to be a logic state zero. In certain cache line miss requests, the data processing system's operations will require that an outstanding access begun by BIU 12 be canceled. If data cache 16 has allocated a way for a requested cache line, BIU 12 must signal data cache 16 to clear the reserved location due to the canceled operation. This may easily be accomplished by only clearing one of either the modified bit or the shared bit.

FIGS. 5 through 11 depict state-transition diagrams of the data coherency protocol executed by the data processor depicted in FIG. 1. The depicted data protocol characterizes every external bus transaction that modifies these data states as one of five operations: (1) clean, (2) flush, (3) kill, (4) read (external), or (5) write (external). The depicted data protocol also characterizes every internal data processor transaction that modifies these data states as one of four operations: (1) read hit (internal), (2) read miss (internal), (3) write hit (internal), or (4) write miss (internal).

Figure 5:
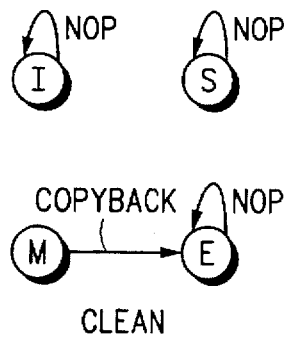
FIGS. 5 through 11 depict state-transition diagrams of the data coherency protocol executed by the data processor depicted in FIG. 1.

FIG. 5 depicts a state diagram of the clean operation in a MESI data coherency protocol. A bus transaction characterized as a clean operation forces all data processors in a data processing system to copy modified data back to the main memory system. In the PowerPC Architecture instruction set, data processor 10 snoops two instructions that are characterized as clean operations: clean and read with no intent to cache. If data processor 10 receives a transaction type signal from an external device corresponding to a clean operation and it contains the identified data, then it will modify the data state of the data according to FIG. 5. In particular, if the data state of the snooped data is exclusive modified, then data processor 10 will assert control signals to the external device delaying the externals device's transaction. Data processor 10 will write its copy of the data associated with the snooped address back to main memory in the following address tenure. This procedure is called a snoop copyback operation. Then, data processor 10 will change the data state of the snooped data from exclusive modified to exclusive unmodified. If the data state of the snooped data is invalid, shared, or exclusive unmodified, then data processor 10 does nothing (indicated as a no operation or NOP).

Figure 6:
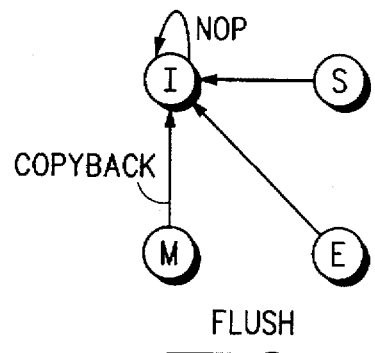

FIG. 6 depicts a state diagram of the flush operation in a MESI data coherency protocol. A bus transaction characterized as a flush operation forces all data processors in a data processing system to copy modified data back to the main memory system and to invalidate any copies of the snooped data. In the PowerPC Architecture instruction set, data processor 10 snoops one instruction that is characterized as a flush operation: flush. If data processor 10 receives a transaction type signal from an external device corresponding to a flush operation and it contains the identified data, then it will modify the data state of the data according to FIG. 6. In particular, if the data state of the snooped data is exclusive modified, then data processor 10 will assert control signals to the external device delaying the externals device's transaction. Data processor 10 will write its copy of the data associated with the snooped address back to main memory in the following address tenure. Then, data processor 10 will change the data state of the snooped data from exclusive modified to invalid. If the data state of the snooped data is shared or exclusive unmodified, then data processor 10 will modify the data state of the snooped address to invalid. If the data state of the snooped data is invalid, then data processor 10 does nothing.

Figure 7:
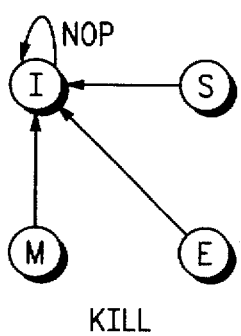

FIG. 7 depicts a state diagram of the kill operation in a MESI data coherency protocol. A bus transaction characterized as a kill operation forces all data processors in a data processing system to invalidate snooped data. In the PowerPC Architecture instruction set, data processor 10 snoops two instructions that are characterized as kill:kill and write-with-kill. If data processor 10 receives a transaction type signal from an external device corresponding to a kill operation and it contains the identified data, then it will modify the data state of the data according to FIG. 7. In particular, if the data state of the snooped data is exclusive modified, shared, or exclusive unmodified, then data processor 10 will change the data state of the snooped data to invalid. If the data state of the snooped data is invalid, then data processor 10 does nothing.

Figure 8:
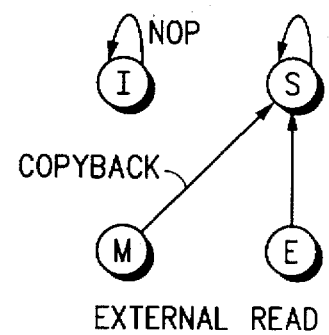

FIG. 8 depicts a state diagram of the external read operation in a MESI data coherency protocol. A bus transaction characterized as a read operation forces all data processors in a data processing system to copy modified data back to the main memory system and to relinquish ownership of snooped data. In the PowerPC Architecture instruction set, data processor 10 snoops two instructions that are characterized as read operations: read and read-atomic. If data processor 10 receives a transaction type signal from an external device corresponding to a read operation and it contains the identified data, then it will modify the data state of the data according to FIG. 8. In particular, if the data state of the snooped data is exclusive modified, then data processor 10 will assert control signals to the external device delaying the externals device's transaction. Data processor 10 will write its copy of the data associated with the snooped address back to main memory in the following address tenure. Then, data processor 10 will change the data state of the snooped data from exclusive modified to shared. If the data state of the snooped data is exclusive unmodified, then data processor 10 will modify the data state of the snooped address to shared. If the data state of the snooped data is invalid or shared, then data processor 10 does nothing.

Figure 9:
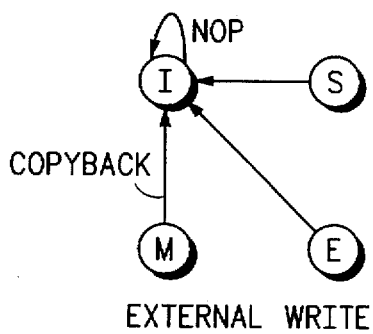

FIG. 9 depicts a state diagram of the write operation in a MESI data coherency protocol. A bus transaction characterized as a write operation forces all data processors in a data processing system to copy modified data back to the main memory system and to invalidate any copies of the data. In the PowerPC Architecture instruction set, data processor 10 snoops four instructions that are characterized as a write operation: read-with-intent-to-modify, read-with-intent-to-modify-atomic, write-with-flush, and write-with-flush-atomic. If data processor 10 receives a transaction type signal from an external device corresponding to a write operation and it contains the identified data, then it will modify the data state of the data according to FIG. 9. In particular, if the data state of the snooped data is exclusive modified, then data processor 10 will assert control signals to the external device delaying the externals device's transaction. Data processor 10 will write its copy of the data associated with the snooped address back to main memory in the following address tenure. Then, data processor 10 will change the data state of the snooped data from exclusive modified to invalid. If the data state of the snooped data is shared, or exclusive unmodified, then data processor 10 will modify the data state of the snooped address to invalid. If the data state of the snooped data is invalid, then data processor 10 does nothing.

FIG. 10 depicts a state diagram of an internal read miss and an internal write miss operation in a MESI data coherency protocol. Data processor 10 transmits an external read and an external write transaction type to the other devices in the data processing system when it performs an internal read miss and an internal write miss operation, respectively. The external devices then operate according to the state-transition diagram depicted in FIGS. 8 and 9.

In the PowerPC Architecture instruction set, data processor 10 executes thirty-nine instructions that are characterized as an internal read operation. These are load instructions (LD) of varying types, a data-cache-block-touch (DCBT) instruction, and a data-cache-block-touch-for-store (DCBTST) instruction. If data processor 10 executes an instruction characterized as an internal read operation and it does not contain the operand data of the instruction (a data cache miss), then data processor 10 will modify the data state of the operand data according to FIG. 10. In particular, data processor 10 will first select a way in which to store the requested data when the data is returned by the main memory. Data processor 10 will change the state of the allocated way from exclusive modified, exclusive unmodified, shared, or invalid, to allocated. The unallocated ways in the set will remain in their previous data states (NOPs). When the main memory returns the requested data to data cache 16, data cache 16 will record the data state of the memory as maintained by the operating system of the data processing system, either exclusive unmodified or shared. As described above, data processor 10 may cancel a data request. In this case, data processor 10 will modify the allocated data state to invalid.

In the PowerPC Architecture instruction set, data processor 10 executes thirty-two instructions that are characterized as an internal write operation. These are store instructions (ST) of varying types and a data-cache-block-set-to-zero instruction (DCBZ). If data processor 10 executes an instruction characterized as an internal write operation and it does not contain the operand data of the instruction (a data cache miss), then data processor 10 will modify the data state of the operand data according to FIG. 10. In particular, data processor 10 will first select a way in which to store the requested when the data is returned by the main memory. Data processor 10 will change the state of the allocated way from exclusive modified, exclusive unmodified, shared, or invalid, to allocate. The unallocated ways in the set will remain in their previous data states (NOPs). When the main memory returns the requested data to data cache 16, data cache 16 will write the data state exclusive modified to the allocated way. As described above, data processor 10 may cancel a data request. In this case, data processor 10 will modify the allocated data state to invalid.

Figure 11:
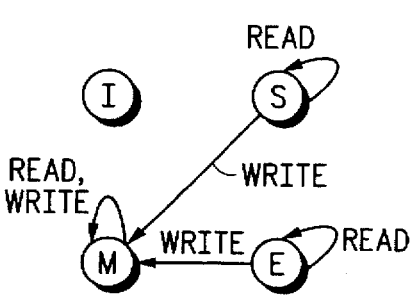

FIG. 11 depicts a state diagram of the internal read hit and internal write hit operations in a MESI data coherency protocol. Data processor 10 transmits an external read and an external write transaction type to the other devices in the data processing system when it performs an internal write hit operation to a shared data line. The external devices then operate according to the state-transition diagram depicted in FIGS. 9 and 10.

Data processor 10 characterizes the same instructions as internal read hit operations and internal write hit instructions that it characterizes as internal read miss operations and internal write miss operations, respectively. However, in the internal hit operations, the operand data of the instructions are contained in data cache 16.

If data processor 10 executes an instruction characterized as an internal read hit operation, then data processor 10 will modify the data state of the operand data according to FIG. 11. In particular, if the data state of the operand data is shared, exclusive unmodified, or exclusive modified, then data processor 10 will do nothing.

If data processor 10 executes an instruction characterized as an internal write hit operation, then data processor 10 will modify the data state of the operand data according to FIG. 11. In particular, if the data state of the operand data is shared or exclusive unmodified, then data processor 10 will modify the data state of the operand data to exclusive modified. If the data state of the operand data is exclusive modified, then data processor 10 will do nothing.

Although the present invention has been described with reference to a specific embodiment, further modifications and improvements will occur to those skilled in the art. For instance, the disclosed invention may be incorporated into data processors traditionally classified as complex instruction set computers or CISC machines. Also, certain functional units may be omitted in certain embodiments or relocated to other areas of data processor 10. It is to be understood therefore, that the invention encompasses all such modifications that do not depart from the spirit and scope of the invention as defined in the appended claims.

What is claimed is:

1. A data processor comprising:

an execution unit generating a first address of a first requested cache line and a second address of a second requested cache line;

a memory cache coupled to the execution unit, the memory cache comprising:

a cache array comprising a plurality of sets, each one of the plurality of sets comprising a plurality of ways, each one of the plurality of ways comprising a cache line, a tag, and an allocate bit, the cache array outputting a cache line of a selected way, the selected way being one of the plurality of ways of a selected set, the tag of the selected way logically equivalent to a subset of the first address of the requested cache line and the allocate bit equivalent to a first state, the selected set being one of the plurality of sets, the selected set selected responsive to a subset of the first address of the requested cache line; and a control unit coupled to the cache array, in an event of a cache line miss, the control unit selecting an allocated way and writing a second state to the allocate bit thereof the allocated way one of a plurality of ways of the selected set, the control unit storing the requested cache line in the allocated way after receiving it from a memory system and writing, the first state to the allocate bit thereof, the control unit operable to present a second address to the cache array after the cache line miss and prior to receiving the requested cache line from the memory system.

2. The data processor of claim 1 further comprising a translation circuit coupled to the execution unit and to the cache array, the translation circuit translating a subset of the first address of the first cache line, a real tag, the tag of the selected way logically equivalent to the real tag.

3. The data processor of claim 2 wherein the control unit stores a plurality of status bits for each of the plurality of sets, each of the plurality of status bits representative of a least recently accessed way in each of the plurality of sets.

4. The data processor of claim 1 wherein the control unit stores a plurality of status bits for each of the plurality of sets, each of the plurality of status bits representative of a least recently accessed way in each of the plurality of sets.

5. A method of operating a memory cache comprising the steps of:

receiving a first input address of a first requested data line in the memory cache;

determining that the first requested data line is not present in the memory cache;

allocating a storage location in the memory cache, an allocated cache line, by changing a state of an allocate bit associated with the allocated cache line;

receiving an second input address of a second requested data line in the memory cache;

determining whether the second requested data line is or is not present in the memory cache after the step of allocating;

requesting the first data line from an external storage device;

receiving the first requested data line from the external device in the memory cache subsequent to the step of determining whether the second requested data line is or is not present in the memory cache; and storing the first requested data line in the allocated cache line and modifying the state of the allocate bit thereof.

6. The method of claim 5 wherein the step of first determining further comprises:

a step of selecting one of a plurality of sets of the memory cache responsive to the first input address, a selected set, each of the plurality of sets comprising a plurality of ways, each one of the plurality of ways comprising the cache line and a tag; and a step of comparing a subset of the first input address to each tag of the selected set.

7. The method of claim 6 further comprising a step of translating a portion of a received virtual address into the first input address.

8. The method of claim 7 wherein the step of allocating comprises:

a step of determining if any cache line of the selected set is invalid, an invalid way; and a step of selecting the invalid way, the allocated cache line.

9. The method of claim 8 wherein the step of allocating further comprises:

a step of third determining a least recently used way of the selected set if no cache line of the selected set is invalid;

a step of fourth determining if the least recently used way is an allocated cache line responsive to a prior step of allocating, a previously allocated way; and a step of third selecting the least recently used way as the allocated cache line if the least recently used way is not the previously allocated way.

10. The method of claim 5 wherein the step of allocating comprises:

a step of determining if any cache line of a selected set is invalid, an invalid way; and a step of selecting the invalid way, an allocated cache line.

11. The method of claim 10 wherein the step of allocating further comprises:

a step of determining a least recently used way of the selected set if no cache line of the selected set is invalid;

a step of determining if the least recently used way is an allocated cache line responsive to a prior step of allocating, a previously allocated way; and a step of selecting the least recently used way as the allocated cache line if the least recently used way is not the previously allocated way.

12. A method of operating a data processor with a data cache comprising:

(A) a step of generating a first input address of a first requested data line;

(B) a step of determining that the first requested data line is not present in the data cache;

(C) a step of allocating a storage location in the data cache, an allocated cache line, by modifying a state of an allocate bit associated with the allocated cache line;

(D) a step of generating a second input address of a second requested data line;

(E) a step of determining that the second requested data line is or is not present in the data cache;

(F) a step of requesting the first requested data line from a storage device external to the data processor;

(G) a step of receiving the first requested data line from the storage device in the data cache; and (H) a step of storing the first requested data line in the allocated cache line and modifying the state of the allocate bit thereof;

wherein the step (D) occurs subsequent to step (B) and wherein the step (D) occurs prior to step (H).

13. The method of claim 12 wherein the step of first determining further comprises:

a step of selecting one of a plurality of sets of the data cache responsive to the input address, a selected set, each of the plurality of sets comprising a plurality of ways, each one of the plurality of ways comprising the cache line and a tag; and a step of comparing a subset of the first input address to each tag of the selected set.

14. The method of claim 13 further comprising a step of translating a portion of a received virtual address into the first input address.

15. The method of claim 14 wherein the step of allocating comprises:

a step of determining if any cache line of the selected set is invalid, an invalid way; and a step of second selecting the invalid way, the allocated cache line.

16. The method of claim 15 wherein the step of allocating further comprises:

a step of determining a least recently used way of the selected set if no cache line of the selected set is invalid;

a step of determining if the least recently used way is an allocated cache line responsive to a prior step of allocating, a previously allocated way; and a step of selecting the least recently used way as the allocated cache line if the least recently used way is not the previously allocated way.

17. The method of claim 12 wherein the step of allocating comprises:

a step of determining if any cache line of the selected set is invalid, an invalid way; and a step of selecting the invalid way, the allocated cache line.

18. The method of claim 17 wherein the step of allocating further comprises:

a step of determining a least recently used way of the selected set if no cache line of the selected set is invalid;

a step of determining if the least recently used way is an allocated cache line responsive to a prior step of allocating, a previously allocated way; and a step of selecting the least recently used way as the allocated cache line if the least recently used way is not the previously allocated way.

* * * * *